United States Patent
Zhou et al.

(10) Patent No.: US 8,925,349 B2
(45) Date of Patent: *Jan. 6, 2015

(54) RARE EARTH ION DOPED SILICATE LUMINESCENCE GLASS AND PREPARATION METHOD THEREOF

(75) Inventors: Mingjie Zhou, Shenzhen (CN); Wenbo Ma, Shenzhen (CN); Zhaopu Shi, Shenzhen (CN); Yanbo Qiao, Shenzhen (CN); Qingtao Li, Shenzhen (CN)

(73) Assignee: Ocean's King Lighting Science & Technology Co., Ltd., Shenzhen (CN)

( * ) Notice: Subject to any disclaimer, the term of this patent is extended or adjusted under 35 U.S.C. 154(b) by 160 days.

This patent is subject to a terminal disclaimer.

(21) Appl. No.: 13/320,753

(22) PCT Filed: May 19, 2009

(86) PCT No.: PCT/CN2009/071852
§ 371 (c)(1),
(2), (4) Date: Nov. 16, 2011

(87) PCT Pub. No.: WO2010/133025
PCT Pub. Date: Nov. 25, 2010

(65) Prior Publication Data
US 2012/0061615 A1    Mar. 15, 2012

(51) Int. Cl.
*C03C 3/095* (2006.01)
*C03C 6/04* (2006.01)
*C03B 32/00* (2006.01)
*C03C 4/12* (2006.01)
*C03C 3/062* (2006.01)

(52) U.S. Cl.
CPC . *C03C 4/12* (2013.01); *C03C 3/062* (2013.01); *C03C 3/095* (2013.01)

USPC ............. 65/32.1; 65/134.1; 501/27; 501/64

(58) Field of Classification Search
CPC .................................. C03C 3/095; C03C 4/12
See application file for complete search history.

(56) References Cited

U.S. PATENT DOCUMENTS 3,763,052 A * 10/1973 Deeg et al. ............. 252/301.4 F
4,566,987 A * 1/1986 Gliemeroth et al. .... 252/301.4 F
(Continued)

FOREIGN PATENT DOCUMENTS

CN    1450010 A    10/2003

OTHER PUBLICATIONS (Makowska-Janusik et. al., "Nonlinear optical phenomena in the Al2O3—P2O5, Er- and Yb-doped silica glasses", 2000 J. Opt. A: Pure Appl. Opt. 2 43).*

(Continued)

*Primary Examiner* — Jason L Lazorcik

(57) ABSTRACT

A rare earth ion doped silicate luminescence glass and preparation method thereof are provided. The luminescence glass is the material with the following formula: $aM_2O \cdot bM'_2O_3 \cdot cSiO_2 \cdot dRE_2O_3$, wherein M is at least one of Na, K and Li, M' is at least one of Y, Gd, La, Sc and Lu, RE is at least one of Ce, Tm, Tb, Ho, Dy, Er, Nd, Sm, Eu and Pr. The preparation method is: grinding the raw material until mixed uniformly, calcining the raw material at 1200-1500° C. for 1-5 h, cooling to room temperature, annealing at 600-1100° C. for 0.5-24 h, cooling to room temperature again, molding then getting the product. The performance of the product is stable. The product is homogenous, and the luminescence performance is good. The light transmittance is high. The process of the preparation method is simple and with low cost.

2 Claims, 4 Drawing Sheets

(56) References Cited

U.S. PATENT DOCUMENTS

| | | | |
|---|---|---|---|
| 4,798,681 A * | 1/1989 | Oversluizen et al. | 252/301.4 F |
| 5,977,556 A * | 11/1999 | Qiu et al. | 250/585 |
| 7,132,060 B2 * | 11/2006 | Zagumennyi et al. | 252/301.4 F |
| 7,910,505 B2 * | 3/2011 | Seneschal-Merz et al. | 501/10 |
| 7,938,551 B2 * | 5/2011 | Chen et al. | 362/84 |
| 8,216,671 B2 * | 7/2012 | Zhou et al. | 428/336 |
| 2006/0063009 A1 | 3/2006 | Naitou et al. | |
| 2007/0045555 A1 * | 3/2007 | Fu | 250/370.11 |
| 2007/0045564 A1 * | 3/2007 | Fu | 250/483.1 |

OTHER PUBLICATIONS (Skoptsov et. al.,"Luminescence of transparent glass ceramics containing Er3+ and Yb3+ zirconate-titanate nanocrystals", Journal of Applied Spectroscopy Nov. 2011, vol. 78, Issue 5, pp. 650-658.*

English language translation of Chinese patent publication No. 1450010A; Published Oct. 22, 2003.*

Liritzis (Obsidian and Ancient Manufactured Glasses, eds. Loannis Liritzis, Christopher M. Stevenson, University of New Mexico Press, §2.1, (2012); ISBN 978-0-8263-5161-6).*

International Search Report of PCT/CN2009/071852.

* cited by examiner

RARE EARTH ION DOPED SILICATE LUMINESCENCE GLASS AND PREPARATION METHOD THEREOF

FIELD OF THE INVENTION

The present invention belongs to the technical field of luminescence material, and relates to a luminescence glass and preparation method thereof, more particularly, to a rare earth ion doped silicate luminescence glass and preparation method thereof.

BACKGROUND OF THE INVENTION

With the development of semiconductor lighting technology (LED), such new light source has come into our daily life gradually. When the third generation semiconductor material gallium nitride is used as the semiconductor lighting source, its power consumption is only one-tenth of that of a common incandescent lamp under the same brightness; its lifetime can reach more than 1 million hours as well. As a new-type lighting technology, LED can be applied into varieties of fields such as indication, display, decoration, backlight and general lighting due to its numerous advantages including energy conservation, green environmental protection and flexible application etc., which is to bring about a revolution in the lighting field.

At present, most commercial white light LED lighting devices are realized by the cooperation between blue light LED chips and fluorescent powders which are capable of emitting yellow or green-orange light when excited by blue light. Such kind of fluorescent powder has higher luminous efficiency and matured preparation method. However, the light source devices manufactured by this method has the following drawbacks: (1) the epoxy resin for encapsulation ages easily, thus reducing the device lifetime; (2) its process is complex and cost is high; (3) the color coordinate is unstable and the white light is easy to drift.

SUMMARY OF THE INVENTION

The objective of the present invention is to provide a rare earth ion doped silicate luminescence glass which has good stability and homogeneity, high transmittance as well as good luminescent properties, aiming at the drawbacks that the device lifetime is reduced, the encapsulation process is complex and the cost is high as a result of the easy aging of the epoxy resin for encapsulating the luminescence fluorescent powder; and the color coordinate is unstable and the white light is easy to drift in the prior art.

Another objective of the present invention is to provide a preparation method for rare earth ion doped silicate luminescence glass which is simple and with low cost.

According to an aspect, a rare earth ion doped silicate luminescence glass is provided, which is a material with following general formula: $aM_2O \cdot bM'_2O_3 \cdot cSiO_2 \cdot RE_2O_3$, wherein M is at least one selected from a group of Na, K and Li, M' is at least one selected from a group of Y, Gd, La, Sc and Lu, RE is at least one selected from a group of Ce, Tm, Tb, Ho, Dy, Er, Nd, Sm, Eu and Pr, and a, b, c and d represent mole fraction, ranges of which are respectively 25~50, 0~40, 30~70 and 0.001~20.

In the rare earth ion doped silicate luminescence glass, a preferably has a range of 30~45, b preferably has a range of 5~30, c preferably has a range of 30~60, and d preferably has a range of 0.1~20 respectively.

According to an aspect, a preparation method for rare earth ion doped silicate luminescence glass is provided, which comprising following steps: taking components A, B, C and D as raw material, grinding the raw material until mixed uniformly, calcining the raw material for 0.5~5 h after raising temperature to 1200~1650° C. then cooling the raw material to room temperature, annealing the raw material for 0.5~24 h after raising temperature to 600~1100° C., then cooling the raw material to room temperature again, molding obtained product and then getting the rare earth ion doped silicate luminescence glass; wherein the component A is at least one selected from a group of carbonate of Na, K and Li, the component B is at least one selected from a group of oxide of Y, Gd, La, Sc and Lu, oxalate of Y, Gd, La, Sc and Lu or carbonate of Y, Gd, La, Sc and Lu, the component C is $SiO_2$, and the component D is at least one selected from a group of oxide of Ce, Tm, Tb, Ho, Dy, Er, Nd, Sm, Eu and Pr, oxalate of Ce, Tm, Tb, Ho, Dy, Er, Nd, Sm, Eu and Pr or carbonate of Ce, Tm, Tb, Ho, Dy, Er, Nd, Sm, Eu and Pr.

The preparation method for rare earth ion doped silicate luminescence glass, further comprises placing the raw material in a mortar, grinding the raw material therein, melting the raw material at 1300~1600° C. for 1~3 h in a crucible, pouring out melted frit and cooling the melted frit to room temperature, then placing the melted frit in a tube furnace or low-temperature annealing furnace and annealing the melted frit for 2~15 h after raising temperature to 650~900° C., then cooling the obtained product to room temperature again and obtaining the rare earth ion doped silicate luminescence glass after molding.

In the preparation method for rare earth ion doped silicate luminescence glass, ratio of each raw material is determined in accordance with molar fraction of each element in following general formula: $aM_2O \cdot bM'_2O_3 \cdot cSiO_2 \cdot dRE_2O_3$; wherein M is at least one selected from a group of Na, K and Li, M' is at least one selected from a group of Y, Gd, La, Sc and Lu, $R^E$ is at least one selected from a group of Ce, Tm, Tb, Ho, Dy, Er, Nd, Sm, Eu and Pr, and a, b, c and d represent mole fraction, ranges of which are respectively 25~50, 0~40, 30~70 and 0.001~20.

In the preparation method for rare earth ion doped silicate luminescence glass, a preferably has a range of 30~45, b preferably has a range of 5~30, the c preferably has a range of 30~60, and the d preferably has a range of 0.1~20 respectively.

In the raw material, purities of the oxide, oxalate or carbonate of the component B and D as well as other raw materials are no less than analytic purity.

In the raw material, the component D is preferably at least one selected from a group of oxide of Tm, Tb, Dy, Sm and Eu, oxalate of Tm, Tb, Dy, Sm and Eu or carbonate of Tm, Tb, Dy, Sm and Eu.

In the present invention, specific kinds of rare earth ion are doped into the silicate glass to prepare a new-type luminescence glass. Compared with a powder material, the luminescence glass of the present invention has the following significant advantages when excited by a blue-purple light: (1) good transmittance; (2) good chemical stability and thermostability; (3) simple preparation process and low cost; (4) be easily made into big bulk and different shapes; (5) capable of replacing the epoxy resin. Since these features, the glass capable of achieving a high-performance luminescence is very suitable as the luminescence medium material in the LED lighting field.

The preparation method of the present invention is simple in process and low in cost, and has specific kinds of rare earth ion to be doped selectively, solving the problem that many light-emitting active ions in the glass has very low luminous intensity or even emits no light since the luminescence glass is limited by the glass preparation condition and glass structure.

BRIEF DESCRIPTION OF THE DRAWINGS

The present invention will be further described with reference to the accompanying drawings and embodiments in the following. In the Figures.

wherein the Shimadzu RF-5301 fluorescence spectrometer is used for the emission spectrum determination.

DETAILED DESCRIPTION OF THE PREFERRED EMBODIMENT

The present invention will be further explained in detail according to some examples in the following; wherein the raw materials used in each example are common ones in the chemical field or commercial ones.

Example 1

Figure 1:
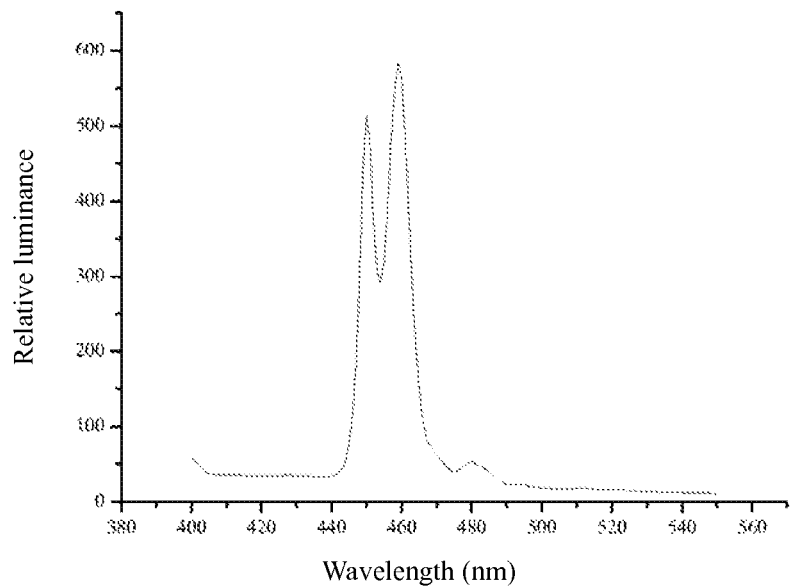
FIG. 1 is the emission spectrum of the luminescence glass prepared in the example 1 excited at 359 nm.

$Na_2CO_3$, $SiO_2$ of analytic purity as well as $Y_2O_3$ and $Tm_2O_3$ of 99.99% are taken as main raw materials. 10.24 g $Na_2CO_3$, 7.13 g $Y_2O_3$, 11.62 g $SiO_2$ and 0.24 g $Tm_2O_3$ are mixed together and the obtained mixture is melted at 1400° C. for 2 h. After that the melted frit is poured out, cooled to the room temperature and placed in a low-temperature annealing furnace with temperature raised to 700° C. in air atmosphere, and then annealed for 5 h at 700° C. After a molding process, the glass of $30Na_2O.9.8Y_2O_3.60SiO_2.0.2Tm_2O_3$ (among it, the coefficient in front of each component means its mole fraction, which is similar hereafter) emitting a blue light is obtained. As shown in FIG. 1, it is the emission spectrum of the luminescence glass prepared in the example excited by an ultraviolet light at 359 nm. As shown in FIG. 1, the luminescence glass prepared in the example emits a blue light of 455 nm when excited at 359 nm.

Example 2

$Li_2CO_3$, $SiO_2$ of analytic purity as well as $Y_2O_3$ and $Tm_2O_3$ of 99.99% are taken as main raw materials. 8.15 g $Li_2CO_3$, 8.14 g $Y_2O_3$, 13.27 g $SiO_2$ and 0.28 g $Tm_2O_3$ are mixed together and the obtained mixture is melted at 1350° C. for 2 h. After that the melted frit is poured out, cooled to the room temperature and placed in a low-temperature annealing furnace with temperature raised to 600° C. in air atmosphere, and then annealed at 600° C. for 8 h. After a molding process, the glass of $30Li_2O.9.8Y_2O_3.60SiO_2.0.2Tm_2O_3$ emitting a blue light is obtained.

Example 3

$K_2CO_3$, $SiO_2$ of analytic purity as well as $Y_2O_3$ and $Tm_2O_3$ of 99.99% are taken as main raw materials. 11.88 g $K_2CO_3$, 6.34 g $Y_2O_3$, 10.33 g $SiO_2$ and 0.22 g $Tm_2O_3$ are mixed together and the obtained mixture is melted at 1450° C. for 2 h. Then the melted frit is poured out, cooled to the room temperature and placed in a low-temperature annealing furnace with temperature raised to 800° C. in air atmosphere, and then annealed at 800° C. for 4 h. After a molding process, the glass of $30K_2O.9.8Y_2O_3.60SiO_2.0.2Tm_2O_3$ emitting a blue light is obtained.

Example 4

$K_2CO_3$, $SiO_2$ of analytic purity as well as $Lu_2O_3$ and $Tm_2O_3$ of 99.99% are taken as main raw materials. 9.95 g $K_2CO_3$, 9.36 g $Lu_2O_3$, 8.65 g $SiO_2$ and 0.18 g $Tm_2O_3$ are mixed together and the obtained mixture is melted at 1500° C. for 1 h. Then the melted frit is poured out, cooled to the room temperature and placed in a low-temperature annealing furnace with temperature raised to 1100° C. in air atmosphere, and then annealed at 1100° C. for 0.5 h. After a molding process, the glass of $30K_2O.9.8Lu_2O_3.60SiO_2.0.2Tm_2O_3$ emitting a blue light is obtained.

Example 5

$Li_2CO_3$, $SiO_2$ of analytic purity as well as $Gd_2O_3$ and $Tm_2O_3$ of 99.99% are taken as main raw materials. 6.81 g $Li_2CO_3$, 10.92 g $Gd_2O_3$, 11.08 g $SiO_2$ and 0.23 g $Tm_2O_3$ are mixed together and the obtained mixture is melted at 1400° C. for 2 h. Then the melted frit is poured out, cooled to the room temperature and placed in a low-temperature annealing furnace with temperature raised to 650° C. in air atmosphere, and then annealed at 650° C. for 15 h. After a molding process, the glass of $30Li_2O.9.8Gd_2O_3.60SiO_2.0.2Tm_2O_3$ emitting a blue light is obtained.

Example 6

$Na_2CO_3$, $SiO_2$ of analytic purity as well as $La_2O_3$ and $Tm_2O_3$ of 99.99% are taken as main raw materials. 9.09 g $Na_2CO_3$, 9.13 g $La_2O_3$, 10.31 g $SiO_2$ and 0.22 g $Tm_2O_3$ are mixed together and the obtained mixture is melted at 1400° C. for 2 h. Then the melted frit is poured out, cooled to the room temperature and placed in a low-temperature annealing furnace with temperature raised to 700° C. in air atmosphere, and then annealed at 700° C. for 5 h. After a molding process, the glass of $30Na_2O.9.8La_2O_3.60SiO_2.0.2Tm_2O_3$ emitting a blue light is obtained.

Example 7

$Na_2CO_3$, $SiO_2$ of analytic purity as well as $Sc_2O_3$ and $Tm_2O_3$ of 99.99% are taken as main raw materials. 11.52 g $Na_2CO_3$, 4.9 g $Sc_2O_3$, 13.07 g $SiO_2$ and 0.27 g $Tm_2O_3$ are mixed together and the obtained mixture is melted at 1450° C. for 2 h. Then the melted frit is poured out, cooled to the room temperature and placed in a low-temperature annealing furnace with temperature raised to 700° C. in air atmosphere, and then annealed at 700° C. for 5 h. After a molding process, the glass of $30Na_2O.9.8Sc_2O_3.60SiO_2.0.2Tm_2O_3$ emitting a blue light is obtained.

Example 8

$Na_2CO_3$, $SiO_2$ of analytic purity as well as $Y_2O_3$ and $CeO_2$ of 99.99% are taken as main raw materials. 10.22 g $Na_2CO_3$, 6.89 g $Y_2O_3$, 11.59 g $SiO_2$ and 0.55 g $CeO_2$ are mixed together and the obtained mixture is melted at 1450° C. for 5 h. Then the melted frit is poured out, cooled to the room temperature and placed in a tube furnace with temperature raised to 750° C. in a reductive atmosphere of 95% $N_2$+5% $H_2$ (volume percentage, similarly hereinafter), and then annealed at 750° C. for 15 h. After a molding process, the luminescence glass of $30Na_2O.9.5Y_2O_3.60SiO_2.0.5Ce_2O_3$ is obtained.

Example 9

Figure 2:
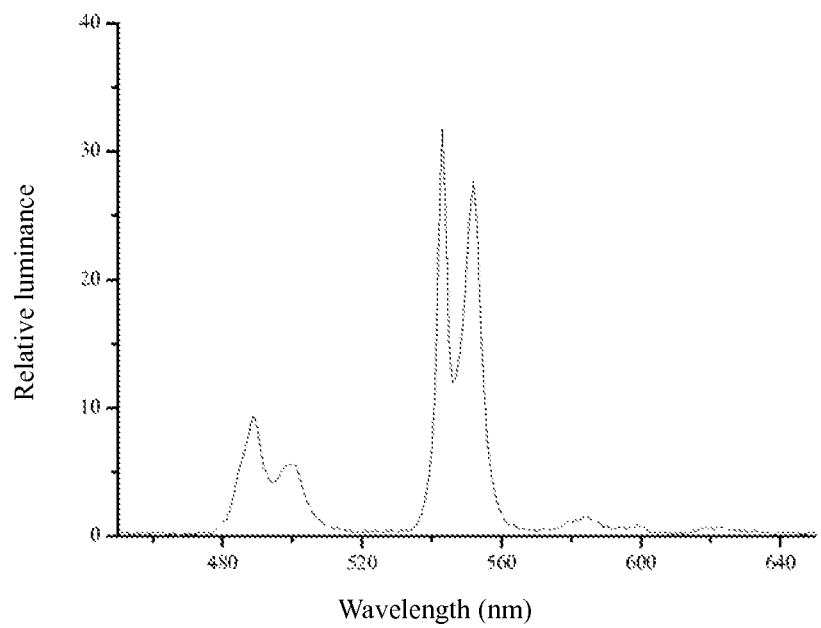
FIG. 2 is the emission spectrum of the luminescence glass prepared in the example 9 excited at 378 nm.

$Na_2CO_3$, $SiO_2$ of analytic purity as well as $Y_2O_3$ and $Tb_4O_7$ of 99.99% are taken as main raw materials. 9.59 g $Na_2CO_3$, 4.08 g $Y_2O_3$, 10.88 g $SiO_2$ and 4.51 g $Tb_4O_7$ are mixed together and the obtained mixture is melted at 1400° C. for 2 h. Then the melted frit is poured out, cooled to the room temperature and placed in a tube furnace with temperature raised to 700° C. in a reductive atmosphere of 95% $N_2$+5% $H_2$ (volume percentage), and then annealed at 700° C. for 5 h. After a molding process, the glass of $30Na_2O.6Y_2O_3.60SiO_2.4Tb_2O_3$ emitting a green light is obtained. As shown in FIG. 2, it is the emission spectrum of the luminescence glass prepared in the example excited by an ultraviolet light at 378 nm. As shown in FIG. 2 the luminescence glass prepared in the example emits a green light of 544 nm when excited at 378 nm.

Example 10

Figure 3:
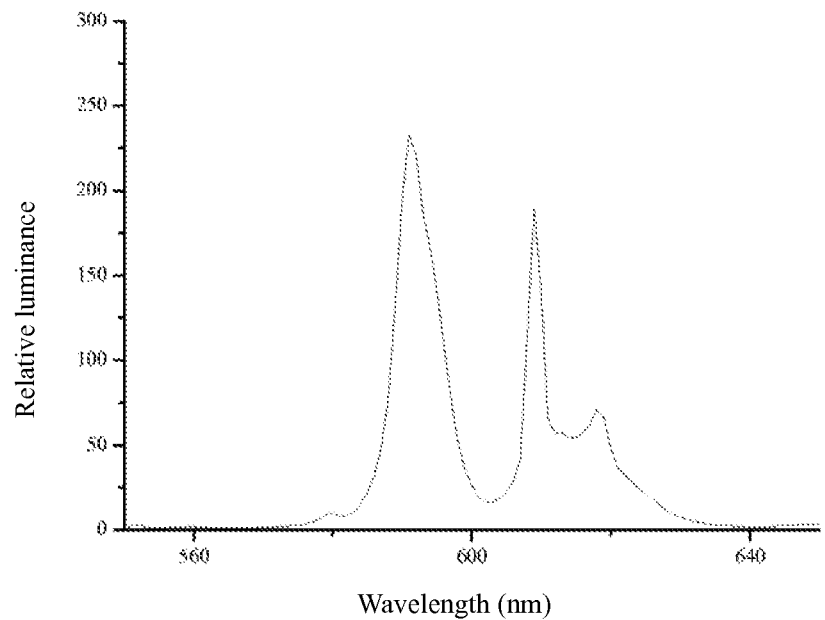
FIG. 3 is the emission spectrum of the luminescence glass prepared in the example 10 excited at 395 nm.

$Na_2CO_3$, $SiO_2$ of analytic purity as well as $Y_2O_3$ and $Eu_2O_3$ of 99.99% are taken as main raw materials. 9.81 g $Na_2CO_3$, 4.87 g $Y_2O_3$, 11.12 g $SiO_2$ and 3.25 g $Eu_2O_3$ are mixed together and the obtained mixture is melted at 1400° C. for 2 h. Then the melted frit is poured out, cooled to the room temperature and placed in a low-temperature annealing furnace with temperature raised to 700° C. in air atmosphere, and then annealed at 700° C. for 5 h. After a molding process, the glass of $30Na_2O.7Y_2O_3.60SiO_2.3Eu_2O_3$ emitting a green light is obtained. As shown in FIG. 3, it is the emission spectrum of the luminescence glass prepared in the example excited by an ultraviolet light at 395 nm. As shown in FIG. 3, the luminescence glass prepared in the example emits a red light of 612 nm when excited at 395 nm.

Example 11

$Na_2CO_3$, $SiO_2$ of analytic purity as well as $Y_2O_3$ and $Ho_2O_3$ of 99.99% are taken as main raw materials. 10.25 g $Na_2CO_3$, 7.13 g $Y_2O_3$, 11.62 g $SiO_2$ and 0.24 g $Ho_2O_3$ are mixed together and the obtained mixture is melted at 1400° C. for 2 h. Then the melted frit is poured out, cooled to the room temperature and placed in a low-temperature annealing furnace with temperature raised to 600° C. in air atmosphere, and then annealed at 600° C. for 24 h. After a molding process, the glass of $30Na_2O.9.8Y_2O_3.60SiO_2.0.2Ho_2O_3$ emitting a green light is obtained.

Example 12

Figure 4:
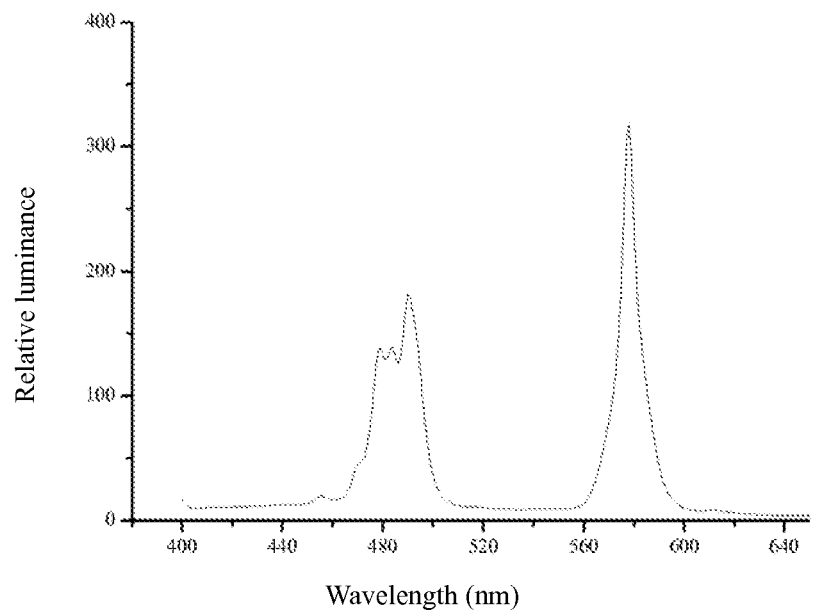
FIG. 4 is the emission spectrum of the luminescence glass prepared in the example 12 excited at 350 nm.

$Na_2CO_3$, $SiO_2$ of analytic purity as well as $Y_2O_3$ and $Dy_2O_3$ of 99.99% are taken as main raw materials. 10.24 g $Na_2CO_3$, 7.13 g $Y_2O_3$, 11.62 g $SiO_2$ and 0.24 g $Dy_2O_3$ are mixed together and the obtained mixture is melted at 1400° C. for 2 h. Then the melted frit is poured out, cooled to the room temperature and placed in a low-temperature annealing furnace with temperature raised to 700° C. in air atmosphere, and then annealed at 700° C. for 5 h. After a molding process, the glass of $30Na_2O.9.8Y_2O_3.60SiO_2.0.2Dy_2O_3$ emitting white light is obtained. As shown in FIG. 4, it is the emission spectrum of the luminescence glass prepared in the example excited by an ultraviolet light at 350 nm. As shown in FIG. 4, the luminescence glass prepared in the example emits a blue light of 485 nm and a yellow light of 578 nm when excited at 350 nm, thus a white light-emitting is achieved by their combination.

Example 13

$Na_2CO_3$, $SiO_2$ of analytic purity as well as $Y_2O_3$ and $Er_2O_3$ of 99.99% are taken as main raw materials. 10.24 g $Na_2CO_3$, 7.13 g $Y_2O_3$, 11.62 g $SiO_2$ and 0.24 g $Er_2O_3$ are mixed together and the obtained mixture is melted at 1400° C. for 2 h. Then the melted frit is poured out, cooled to the room temperature and placed in a low-temperature annealing furnace with temperature raised to 700° C. in air atmosphere, and then annealed at 700° C. for 5 h. After a molding process, the glass of $30Na_2O.9.8Y_2O_3.60SiO_2.0.2Er_2O_3$ emitting a green light is obtained.

Example 14

$Na_2CO_3$, $SiO_2$ of analytic purity as well as $Y_2O_3$ and $Nd_2O_3$ of 99.99% are taken as main raw materials. 10.25 g $Na_2CO_3$, 7.14 g $Y_2O_3$, 11.63 g $SiO_2$ and 0.21 g $Nd_2O_3$ are mixed together and the obtained mixture is melted at 1400° C. for 2 h. Then the melted frit is poured out, cooled to the room temperature and placed in a low-temperature annealing furnace with temperature raised to 700° C. in air atmosphere, and then annealed at 700° C. for 5 h. After a molding process, the glass of $30Na_2O.9.8Y_2O_3.60SiO_2.0.2Nd_2O_3$ emitting yellow-green light is obtained.

Example 15

$Na_2CO_3$, $SiO_2$ of analytic purity as well as $Y_2O_3$ and $Pr_6O_{11}$ of 99.99% are taken as main raw materials. 10.26 g $Na_2CO_3$, 7.14 g $Y_2O_3$, 11.63 g $SiO_2$ and 0.21 g $Pr_6O_{11}$ are mixed together and the obtained mixture is melted at 1400° C. for 2 h. Then the melted frit is poured out, cooled to the room temperature and placed in a low-temperature annealing furnace with temperature raised to 700° C. in air atmosphere, and then annealed at 700° C. for 5 h. After a molding process, the glass of $30Na_2O.9.8Y_2O_3.60SiO_2.0.2Pr_2O_3$ emitting a red light is obtained.

Example 16

Figure 5:
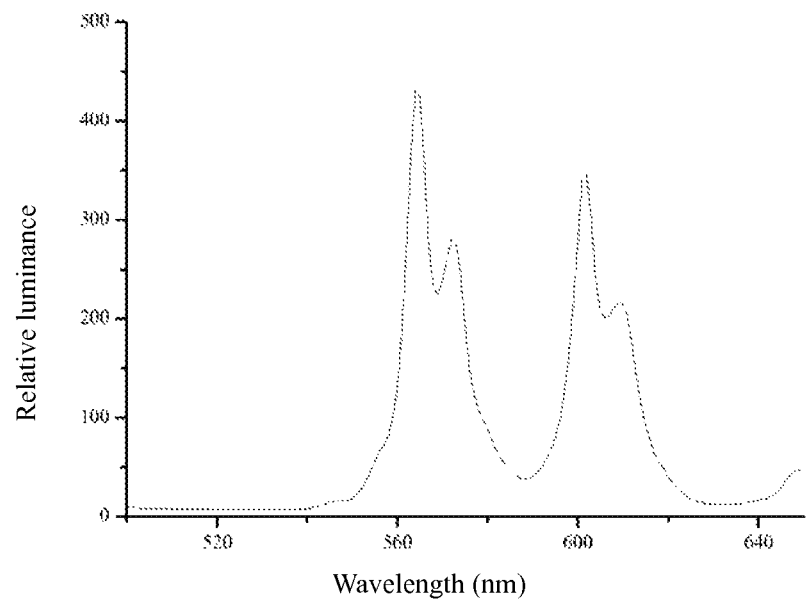
FIG. 5 is the emission spectrum of the luminescence glass prepared in the example 16 excited at 404 nm.

$Na_2CO_3$, $SiO_2$ of analytic purity as well as $Y_2O_3$ and $Sm_2O_3$ of 99.99% are taken as main raw materials. 10.25 g $Na_2CO_3$, 7.14 g $Y_2O_3$, 11.63 g $SiO_2$ and 0.22 g $Sm_2O_3$ are mixed together and the obtained mixture is melted at 1400° C. for 2 h. Then the melted frit is poured out, cooled to the room temperature and placed in a low-temperature annealing furnace with temperature raised to 700° C. in air atmosphere, and then annealed at 700° C. for 5 h. After a molding process, the glass of $30Na_2O.9.8Y_2O_3.60SiO_2.0.2Sm_2O_3$ emitting a red light is obtained. As shown in FIG. 5, it is the emission spectrum of the luminescence glass prepared in the example excited by a purple light at 404 nm. As shown in FIG. 5, the luminescence glass prepared in the example emits a yellow light of 565 nm and a red light of 601 nm when excited at 404 nm

Example 17

Figure 6:
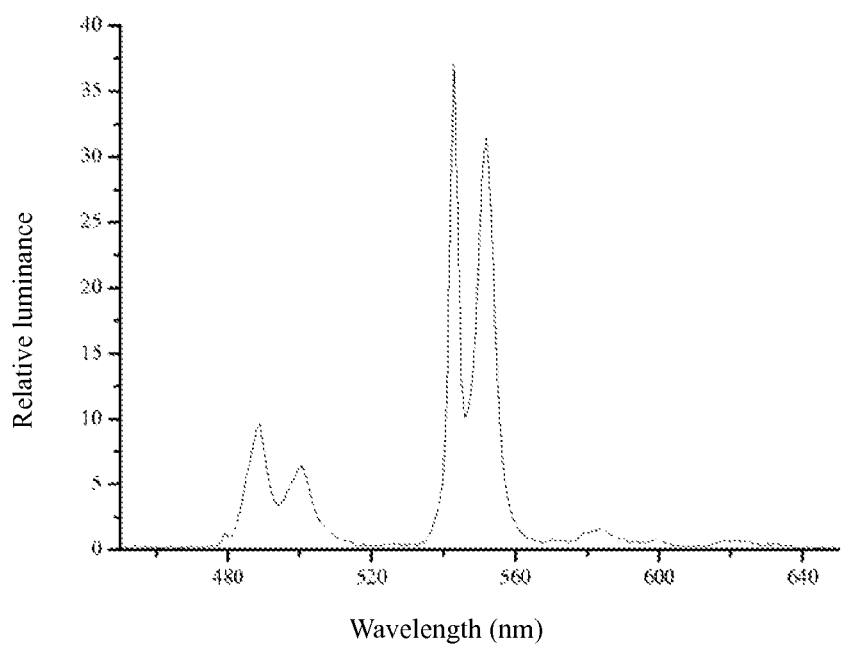
FIG. 6 is the emission spectrum of the luminescence glass prepared in the example 17 excited at 378 nm.

$Na_2CO_3$, $SiO_2$ of analytic purity as well as $Y_2O_3$ and $Tb_4O_7$ of 99.99% are taken as main raw materials. 9.28 g $Na_2CO_3$, 2.63 g $Y_2O_3$, 10.52 g $SiO_2$ and 6.54 g $Tb_4O_7$ are mixed together and the obtained mixture is melted at 1400° C. for 2 h. Then the melted frit is poured out, cooled to the room temperature and placed in a tube furnace with temperature raised to 700° C. in a reductive atmosphere of 95% $N_2$+5% $H_2$ (volume percentage), and then annealed at 700° C. for 5 h. After a molding process, the glass of $30Na_2O.4Y_2O_3.60SiO_2.6Tb_2O_3$ emitting a green light is obtained. As shown in FIG. 6, it is the emission spectrum of the luminescence glass prepared in the example excited by an ultraviolet light at 378 nm. As shown in FIG. 6, the luminescence glass prepared in the example emits a green light of 544 nm when excited at 378 nm.

Example 18

$Na_2CO_3$, $SiO_2$ of analytic purity as well as $Y_2O_3$ and $Eu_2(C_2O_4)_3$ of 99.99% are taken as main raw materials. 6.11 g $Na_2CO_3$, 10.42 g $Y_2O_3$, 6.93 g $SiO_2$ and 6.55 g $Eu_2(C_2O_4)_3$ are mixed together and the obtained mixture is melted at 1500° C. for 1 h. Then the melted frit is poured out, cooled to the room temperature and placed in a low-temperature annealing furnace with temperature raised to 800° C. in air atmosphere, and then annealed at 800° C. for 5 h. After a molding process, the glass of $25Na_2O.20Y_2O_3.50SiO_2.5Eu_2O_3$ emitting a red light is obtained.

Example 19

$Na_2CO_3$, $SiO_2$ of analytic purity as well as $Y_2(CO_3)_3$ and $Eu_2(CO_3)_3$ of 99.99% are taken as main raw materials. 12.53 g $Na_2CO_3$, 5.68 g $Y_2(CO_3)_3$, 11.39 g $SiO_2$ and 3.68 g $Eu_2(CO_3)_3$ are mixed together and the obtained mixture is melted at 1400° C. for 2 h. Then the melted frit is poured out, cooled to the room temperature and placed in a low-temperature annealing furnace with temperature raised to 700° C. in air atmosphere, and then annealed at 700° C. for 5 h. After a molding process, the glass of $35.7Na_2O.4.8Y_2O_3.57.2SiO_2.2.3Eu_2O_3$ emitting a red light is obtained.

Example 20

Figure 7:
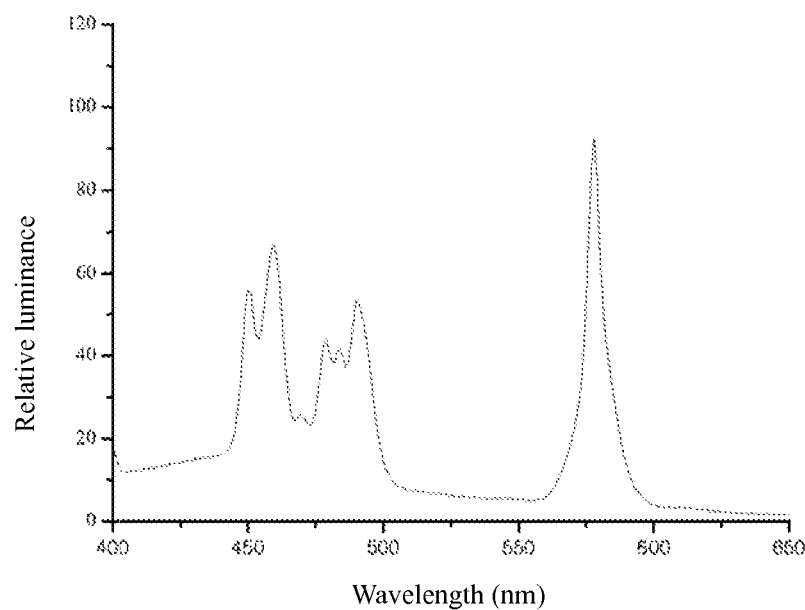
FIG. 7 is the emission spectrum of the luminescence glass prepared in the example 20 excited at 353 nm.

$Na_2CO_3$, $SiO_2$ of analytic purity as well as $Y_2O_3$, $Tm_2O_3$ and $Dy_2O_3$ of 99.99% are taken as main raw materials. 10.22 g $Na_2CO_3$, 7.04 g $Y_2O_3$, 11.6 g $SiO_2$, 0.12 g $Tm_2O_3$ and 0.24 g $Dy_2O_3$ are mixed together and the obtained mixture is melted at 1400° C. for 2 h. Then the melted frit is poured out, cooled to the room temperature and placed in a low-temperature annealing furnace with temperature raised to 700° C. in air atmosphere, and then annealed at 700° C. for 5 h. After a molding process, the glass of $30Na_2O.9.7Y_2O_3.60SiO_2.0.1Tm_2O_3.0.2Dy_2O_3$ emitting white light is obtained. As shown in FIG. 7, it is the emission spectrum of the luminescence glass prepared in the example excited by an ultraviolet light at 353 nm. As shown in FIG. 7, the luminescence glass prepared in the example emits lights of 460 nm, 490 nm and 578 nm when excited by an ultraviolet light at 353 nm, and a white light is obtained through their combination.

Example 21

$Na_2CO_3$, $K_2CO_3$, $Li_2CO_3$, $SiO_2$ of analytic purity as well as $Y_2(C_2O_4)_3$, $Gd_2(C_2O_4)_3$ and $Tb_4O_7$ of 99.99% are taken as main raw materials. 2.86 g $Na_2CO_3$, 3.49 g $K_2CO_3$, 2.37 g $Li_2CO_3$, 9.6 g $Y_2(C_2O_4)_3$, 13.08 g $Gd_2(C_2O_4)_3$, 5.33 g $SiO_2$ and 1.57 g $Tb_4O_7$ are mixed together and the obtained mixture is melted at 1300° C. for 3 h. Then the melted frit is poured out, cooled to the room temperature and placed in a reductive atmosphere and then annealed at 1050° C. for 2.5 h, wherein the volume ratio of the nitrogen and hydrogen in the reducing atmosphere is 95:5. After a molding process, the glass of $12.2Na_2O.11.4K_2O.14.5Li_2O.9.8Y_2O_3.10.2Gd_2O_3.40SiO_2.1.9Tb_2O_3$ emitting a green light is obtained.

Example 22

$Na_2CO_3$, $SiO_2$ of analytic purity as well as $Gd_2O_3$ and $Pr_2(C_2O_4)_3$ of 99.99% are taken as main raw materials. 6.72 g $Na_2CO_3$, 17.23 g $Gd_2O_3$, 6.67 g $SiO_2$ and 0.01 g $Pr_2(C_2O_4)_3$ are mixed together and the obtained mixture is melted at 1420° C. for 10 h. Then the melted frit is poured out, cooled to the room temperature and placed in a low-temperature annealing furnace with temperature raised to 700° C. in air atmosphere, and then annealed at 900° C. for 8 h. After a molding process, the glass of $40Na_2O.30Gd_2O_3.70SiO_2.0.001Pr_2O_3$ emitting a red light is obtained.

Example 23

$Na_2CO_3$, $SiO_2$ of analytic purity as well as $La_2(CO_3)_3$, $Sc_2(CO_3)_3$, $Eu_2(CO_3)_3$ and $Sm_2(CO_3)_3$ of 99.99% are taken as main raw materials. 8.80 g $Na_2CO_3$, 6.1 g $SiO_2$, 1.69 g $La_2(CO_3)_3$, 1.49 g $Sc_2(CO_3)_3$, 4.47 g $Eu_2(CO_3)_3$ and 17.74 g $Sm_2(CO_3)_3$ are mixed together and the obtained mixture is melted at 1650° C. for 0.5 h. Then the melted frit is poured out, cooled to the room temperature and placed in a low-temperature annealing furnace with temperature raised to 880° C. in air atmosphere, and then annealed at 880° C. for 7 h. After a molding process, the glass of $45Na_2O.2La_2O_3.3Sc_2O_3.5Eu_2O_3.55SiO_2.20Sm_2O_3$ emitting a red light is obtained.

Example 24

$K_2CO_3$, $SiO_2$ of analytic purity as well as $Lu_2(C_2C_4)_3$ and $Pr_6O_{11}$, of 99.99% are taken as main raw materials. 12.36 g $K_2CO_3$, 8.58 g $Lu_2(C_2O_4)_3$, 10.91 g $SiO_2$ and 0.09 g $Pr_6O_{11}$ are mixed together and the obtained mixture is melted at 1200° C. for 5 h. Then the melted frit is poured out, cooled to the room temperature and placed in a low-temperature annealing furnace with temperature raised to 700° C. in air atmosphere, and then annealed at 700° C. for 5 h. After a molding process, the glass of $32K_2O.5Lu_2O_3.65SiO_2.0.1Pr_2O_3$ emitting a red light is obtained.

Example 25

$Na_2CO_3$, $SiO_2$ of analytic purity and $Tb_4O_7$ of 99.99% are taken as main raw materials. 7.04 g $Na_2CO_3$, 7.84 g $SiO_2$ and 13.31 g $Tb_4O_7$ are mixed together and the obtained mixture is melted at 1300° C. for 4 h. Then the melted frit is poured out, cooled to the room temperature and placed in a low-temperature annealing furnace with temperature raised to 700° C. in air atmosphere, and then annealed at 700° C. for 5 h. After a molding process, the glass of $28Na_2O.55SiO_2.15Tb_2O_3$ emitting a green light is obtained.

Example 26

$Li_2CO_3$, $SiO_2$ of analytic purity as well as $Y_2O_3$ and $Tb_4O_7$ of 99.99% are taken as main raw materials. 11.01 g $Li_2CO_3$, 5.37 g $SiO_2$, 26.91 g $Y_2O_3$ and 0.11 g $Tb_4O_7$ are mixed together and the obtained mixture is melted at 1600° C. for 1 h. Then the melted frit is poured out, cooled to the room temperature and placed in a low-temperature annealing furnace with temperature raised to 800° C. in air atmosphere, and then annealed at 800° C. for 5 h. After a molding process, the glass of $50Li_2O.40Y_2O_3.30SiO_2.0.1Tb_2O_3$ emitting a green light is obtained.

What claimed is:

1. A preparation method for rare earth ion doped silicate luminescence glass comprising following steps: taking $Na_2CO_3$, $SiO_2$ $Y_2O_3$ and $CeO_2$ as raw materials, mixing the $Na_2CO_3$, $SiO_2$ $Y_2O_3$ and $CeO_2$ together and melting obtained mixture at 1450° C. for 5 h, then pouring out melted frit, cooling the melted frit to a room temperature and then placing the melted frit in a tube furnace with temperature raised to 750° C. in a reductive atmosphere, and annealing the melted frit at 750° C. for 15 h, and finally obtaining the rare earth ion doped silicate luminescence glass of $30Na_2O.9.5Y_2O_3.60SiO_2.0.5Ce_2O_3$ after a molding process.

2. The preparation method for rare earth ion doped silicate luminescence glass according to claim 1, wherein in the $Na_2CO_3$, $SiO_2$ $Y_2O_3$ and $CeO_2$ are no less than analytic purity.

* * * * *